(12) United States Patent
Gohr et al.

(10) Patent No.: US 12,485,658 B2
(45) Date of Patent: Dec. 2, 2025

(54) BIAXIALLY ORIENTED HIGH-DENSITY POLYETHYLENE FILMS WITH IMPROVED SEALANT SKIN

(71) Applicant: Jindal Films Americas LLC, LaGrange, GA (US)

(72) Inventors: Eric T. Gohr, Sharpsburg, GA (US); Robert M. Sheppard, Peachtree City, GA (US); Benoit Ambroise, Nobressart (BE)

(73) Assignee: JFE Innovation Center SRL, Virton (BE)

( * ) Notice: Subject to any disclaimer, the term of this patent is extended or adjusted under 35 U.S.C. 154(b) by 683 days.

(21) Appl. No.: 17/307,230

(22) Filed: May 4, 2021

(65) Prior Publication Data

US 2021/0252842 A1    Aug. 19, 2021

Related U.S. Application Data

(63) Continuation of application No. PCT/US2020/038372, filed on Jun. 18, 2020.

(60) Provisional application No. 62/908,628, filed on Oct. 1, 2019, provisional application No. 62/865,558, filed on Jun. 24, 2019, provisional application No. 62/865,570, filed on Jun. 24, 2019, provisional application No. 62/863,938, filed on Jun. 20, 2019.

(51) Int. Cl.

| | |
|---|---|
| *B32B 27/32* | (2006.01) |
| *B29C 48/00* | (2019.01) |
| *B29C 48/08* | (2019.01) |
| *B29C 48/21* | (2019.01) |
| *B29C 55/14* | (2006.01) |
| *B32B 7/12* | (2006.01) |
| *B32B 27/08* | (2006.01) |
| *B32B 27/16* | (2006.01) |
| *B32B 27/18* | (2006.01) |
| *B32B 27/20* | (2006.01) |
| *B65D 65/40* | (2006.01) |
| *B29K 23/00* | (2006.01) |
| *B29K 105/00* | (2006.01) |

(52) U.S. Cl.
CPC .......... *B32B 27/32* (2013.01); *B29C 48/0018* (2019.02); *B29C 48/08* (2019.02); *B29C 48/21* (2019.02); *B29C 55/143* (2013.01); *B32B 7/12* (2013.01); *B32B 27/08* (2013.01); *B32B 27/16* (2013.01); *B32B 27/18* (2013.01); *B32B 27/20* (2013.01); *B32B 27/327* (2013.01); *B65D 65/40* (2013.01); *B29K 2023/0633* (2013.01); *B29K 2023/065* (2013.01); *B29K 2023/12* (2013.01); *B29K 2105/0008* (2013.01); *B32B 2250/03* (2013.01); *B32B 2250/05* (2013.01); *B32B 2250/24* (2013.01); *B32B 2250/242* (2013.01); *B32B 2255/10* (2013.01); *B32B 2255/20* (2013.01); *B32B 2255/205* (2013.01); *B32B 2255/26* (2013.01); *B32B 2270/00* (2013.01); *B32B 2307/30* (2013.01); *B32B 2307/516* (2013.01); *B32B 2307/518* (2013.01); *B32B 2307/72* (2013.01); *B32B 2307/7244* (2013.01); *B32B 2307/7246* (2013.01); *B32B 2307/732* (2013.01); *B32B 2439/40* (2013.01); *B32B 2439/46* (2013.01); *B32B 2439/70* (2013.01); *B32B 2553/00* (2013.01)

(58) Field of Classification Search
None
See application file for complete search history.

(56) References Cited

U.S. PATENT DOCUMENTS

| | | | |
|---|---|---|---|
| 6,413,333 B1 * | 7/2002 | Bader | B32B 27/08 |
| | | | 156/244.11 |
| 6,773,818 B2 | 8/2004 | Cretekos et al. | |
| 2002/0103300 A1 * | 8/2002 | Klosiewicz | C08J 3/226 |
| | | | 524/570 |
| 2016/0136935 A1 | 5/2016 | Mitchell et al. | |
| 2017/0223879 A1 | 8/2017 | Mitchell et al. | |

OTHER PUBLICATIONS

Copenheaver, Blaine R., International Search Report and Written Opinion on PCTUS2038372, Sep. 28, 2020, USPTO as RO for WIPO, Alexandria, US.

Osterrieder, Erik J., Demand for ISR/WO on PCTUS2038372, Feb. 23, 2021, Rao DeBoer Osterrieder, PLLC, Houston, US.

* cited by examiner

*Primary Examiner* — Samir Shah

(74) *Attorney, Agent, or Firm* — Kearney, McWilliams & Davis; Erik J. Osterrieder

(57) ABSTRACT

Disclosed are compositions and methods for multilayer films, which, in one embodiment may comprise a core layer comprising at least 50 wt. % of high-density polyethylene. Further, the multilayer film may include a first skin layer comprising an ethylene-propylene polymer, and a second skin layer comprising at least one or more α-olefin copolymers and antiblock. One or more of the at least one or more α-olefin copolymers in the second skin layer, which may be a sealant skin layer, may include at least one ethylene-propylene-butylene polymer in combination with a plastomer and/or elastomer that contain propylene, ethylene, or a combination thereof.

19 Claims, No Drawings

BIAXIALLY ORIENTED HIGH-DENSITY POLYETHYLENE FILMS WITH IMPROVED SEALANT SKIN

REFERENCE TO RELATED APPLICATIONS

This is a continuation application, which claims priority to Patent Treaty Cooperation application number PCT/US20/38372 filed on Jun. 18, 2020 that claims priority to each of U.S. provisional patent application Ser. Nos. 62/908,628 filed on 1 Oct. 2019, 62/865,570 filed on 24 Jun. 2019, 62/865,558 filed on 24 Jun. 2019, and 62/863,938 filed on 20 Jun. 2019, wherein each of the foregoing is hereby incorporated by this reference in its entity and is owned by Applicant.

FIELD

This application relates to multilayer films that may have oriented layer(s), such as the core, tie, and/or skin layers, and include polyethylene in the core layer.

BACKGROUND

This disclosure provides for new multilayer films and methods that combine improved sealing properties, e.g., high seal strengths, in films by lowering the minimum seal temperature while avoiding an increase in coefficient of friction and/or providing an increase in solvent adhesive bonds. These are significant functional improvements in films, which may be used in laminating, packaging and/or labelling applications.

SUMMARY

Disclosed are compositions and methods for multilayer films, which, in one embodiment may include a core layer comprising at least 50 wt. % of high-density polyethylene. Further, the multilayer film may include a first skin layer comprising an ethylene-propylene polymer, and a second skin layer comprising at least one or more α-olefin copolymers and antiblock. One or more of the at least one or more α-olefin copolymers in the second skin layer, which may be a sealant skin layer, may include at least one ethylene-propylene-butylene polymer in combination with a plastomer and/or elastomer that contain propylene, ethylene, or a combination thereof. In the same or other example embodiments, the one or more α-olefin copolymers may be metallocene-catalyzed, elastomers, propylene-ethylene polymers, ethylene-based plastomers, propylene-based elastomers, or olefin-block-copolymer elastomers.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

Generally, disclosed are oriented (i.e., monoaxially ("MO") and/or biaxially ("BO")), multilayer, polyethylene ("PE") films comprising, consisting essentially of, or consisting of a high-density polyethylene ("HDPE") and at least one functional terpolymer skin. Surprisingly, as further shown in the experimental and example embodiments section of this disclosure, the standard sealant resins when used in BOHDPE films show an unexpected increase in minimum seal temperature ("MST"); that is, the control resin formulation has a documented MST of 167° F. but its MST increases to 228° F. when used on BOHDPE. Furthermore, the addition of resin with a controlled microstructure, such as metallocene-catalyzed α-olefin polymers, as a component in the sealant skin has been shown to decrease the MST for a 200 g/in seal to nearly the normal range and increase the seal strength at 240° F. from 319 to 476 g/in versus the control without a controlled microstructure resin. The formulations did not show the expected increase in COF with the decrease in MST as is normally experienced. Testing has also demonstrated an increase in solvent adhesive bonds from ~200 grams to ~400 grams with the technology. These are significant functional improvements to films.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Core Layer

As is known to those skilled in the art, the core layer of a multilayered film is most commonly the thickest layer and provides the foundation of the multilayered structure. In some embodiments, the core layer comprises, consists essentially of, or consists of biaxially oriented polyethylene ("BOPE"), such as a high-density polyethylene film ("HDPE") and/or other PE's having a density greater than 0.94 g/cm$^3$. In various embodiments, the core layer comprises at least 50 wt %, at least 60 wt %, at least 70 wt %, at least 80 wt %, at least 85 wt %, at least 90 wt %, at least 95 wt %, or more of HDPE. In alternative embodiments, the core layer may also include other polymers, including, for instance, biaxially oriented polypropylene ("BOPP"), biaxially oriented polyester ("BOPET"), biaxially oriented polylactic acid ("BOPLA"), and combinations thereof. In still alternate embodiments the core layer may also contain lesser amounts of additional polymer(s) selected from the group consisting of ethylene polymer, ethylene-propylene copolymers, ethylene-propylene-butene terpolymers, elastomers, plastomers, different types of metallocene-LLDPEs (m-LLDPEs), and combinations thereof.

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 15 wt %, based on the total weight of the core layer.

Preferably, the total amount of additives in the core layer comprises up to about 20 wt. % of the core layer, but some embodiments may comprise additives in the core layer in an amount up to about 30 wt % of the core layer.

The core layer preferably has a thickness in the range of from about 5 μm to 100 μm, more preferably from about 5 μm to 50 μm, most preferably from 5 μm to 25 μm.

Optional Tie Layer(s)

Tie layer(s) of a multilayered film is typically used to connect two other layers of the multilayered film structure, e.g., a core layer and a sealant layer, and is positioned intermediate these other layers. In various embodiments, the films may have zero, one or two tie layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, maleic-anhydride-modified polyethylene polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, ethyl-methyl acrylate (EMA) polymers, ethylene-vinyl acetate (EVA) polymers, polar copolymers, and combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F. CLYRELL™ SM1340 (commercially available from Basell Polyolefins of The Netherlands), PB (propylene-butene-1) random copolymers, such as Basell PB 8340 (commercially available from Basell Polyolefins of The Netherlands), *Borealis* BORSOFT™ SD233CF, (commercially available from *Borealis* of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 μm, preferably from about 0.50 μm to 12 μm, more preferably from about 0.50 μm to 6 μm, and most preferably from about 2.5 μm to 5 μm. However, in some thinner films, the tie layer thickness may be from about 0.5 μm to 4 μm, or from about 0.5 μm to 2 μm, or from about 0.5 μm to 1.5 μm.

Skin Layer(s), Including Metallizable Skin Layers and Printable Layers

In some embodiments, the skin layer comprises at least one polymer selected from the group comprising, consisting essentially of, and/or consisting of polypropylene copolymers or terpolymers, which may be grafted or copolymerized, and a metallocene based material of either polypropylene or ethylene propylene copolymer.

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 µm through 3.5 µm, or from 0.30 µm through 2 µm, or in many embodiments, from 0.50 µm through 1.0 µm. In thin film embodiments, the skin layer thickness may range from about 0.20 µm through 1.5 µm, or 0.50 µm through 1.0 µm.

Additives

Additives present in the film's layer(s) may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required, and may be added to one or more of the film's layer(s) in solid or solution form, e.g., part of a masterbatch solution or otherwise.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Optionally, nonionic or anionic wax emulsions can be included in the coating(s), i.e., skin layer(s), to improve blocking resistance and/or lower the coefficient of friction. For example, an emulsion of Michem Lube 215, Michem Lube 160 may be included in the skin layer(s). Any conventional wax, such as, but not limited to Carnauba™ wax (commercially available from Michelman Corporation of Cincinnati, Ohio) that is useful in thermoplastic films is contemplated.

Metallization

The outer surface (i.e., side facing away from the core) of a skin layer and/or laminating substrate may undergo metallization after optionally being treated. Metallization may be carried out through conventional methods, such as vacuum metallization by deposition of a metal layer such as aluminum, copper, silver, chromium, or mixtures thereof. Following metallization, a coating may be applied to the outer metallized layer "outside" or "inside" the vacuum chamber to result in the following structure: metallized layer/skin layer/optional tie layer/core/optional tie layer/skin layer/metallized layer. In an additional embodiment, a primer may be applied on the metal surface(s) followed by top coating(s).

In certain embodiments, the metal for metallization is metal oxide, any other inorganic materials, or organically modified inorganic materials, which are capable of being vacuum deposited, electroplated or sputtered, such as, for example, SiOx, AlOx, SnOx, ZnOx, IrOx, wherein x=1 or 2, organically modified ceramics "ormocer", etc. The thickness of the deposited layer(s) is typically in the range from 100 to 5,000 Angstrom or preferably from 300 to 3000 Angstrom.

Surface Treatment

One or both of the outer surfaces of the multilayered films may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt-blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 11-fold TD orientation and at least a 2 or 3 or 7-fold MD orientation. Being so formed, the at least three-layer (one core, two skin layers, 18-21 μm thickness) possess an ultimate tensile strength within the range of from 100 or 110 to 80 or 90 or 250 MPa in the TD in certain embodiments; and possess an ultimate tensile strength within the range of from 30 or 40 to 150 or 130 MPa in the MD in other embodiments.

INDUSTRIAL APPLICABILITY

The disclosed multilayered films may be stand-alone films, laminates, or webs. Or, the multilayered films may be sealed, coated, metallized, and/or laminated to other film structures. The laminating substrate, itself, may for instance, be a BOPE or a non-oriented, cast or blown PE film with or without the assistance of adhesive(s), increases in temperature and/or pressure, water or solvents, etc.; furthermore, the laminating substrate may or may not be metallized and/or coated. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXPERIMENTAL AND EXAMPLE EMBODIMENTS

Table 1 shows the structure and components in an example PE films in line with this disclosure, and Table 2 shows an example thereof; further examples include modifying the following based on the foregoing disclosure.

TABLE 1

| L1 | sealant skin | about 0.5-2 μm | Refer to Table 3 for composition of this layer. |
|----|---|---|---|
| L2 | tie | about 0.5-2 μm | HDPE + mLLDPE + OBC |
| L3 | core | 10 to 50 μm | HDPE + optionally ≤20 wt. % of mLLDPE and HCR masterbatch (e.g., HCR in PE)] |
| L4 | tie | about 0.5-2 μm | HDPE + mLLDPE + OBC |
| L5 | skin | about 0.5-2 μm | EP copolymer + antiblock masterbatch |
|    |      |               | optionally treated |

TABLE 2

| Structure | Wt. % | Material Trade Name | Thickness |
|---|---|---|---|
| Sealant Skin-See table below | | | 0.04 mil |
| HDPE + | 60 | ExxonMobil HTA 108 | 0.04 mil |
| mLLDPE + | 20 | mLLDPE (e.g., melt index 1.9 | |
| OBC | 20 | and melting peak 127° C.) LyondellBasell X500F | |
| HDPE + | 85 | ExxonMobil HTA 108 | 0.79 mil |
| mLLDPE + | 10 | mLLDPE (e.g., melt index 1.9 | |
| HCR in PE MB | 5 | and melting peak 127° C.) Schulman CPS 601 | |
| HDPE + | 60 | ExxonMobil HTA 108 | 0.04 mil |
| mLLDPE + | 20 | mLLDPE (e.g., melt index 1.9 | |
| OBC | 20 | and melting peak 127° C.) LyondellBasell X500F | |
| EP Copolymer | 98 | Total 8573 | 0.04 mil |
| Anti-block MB (5% conc.) Treatment | 2 | Ampacet Seablock 4 | |

Based on the structure in Table 1, sealant skin blends and corresponding heat-seal data for each sample are shown in Table 3. According to according to ASTM F2029 and F88, heat-seal testing was done using a LAKO unit with vertical crimp jaws, jaw pressure of 60 psi, dwell time of 0.75 seconds, and cooling time of 20 seconds. Testing was done from 180 through 270° F. at 10° F. increments. The data below shows the minimum seal temperature ("MST") to form a 200 g/in seal and the seal strength at 240, 250, and 260° F. The control was made with 94% LyondellBasell Adsyl 7410 (167° F. MST resin) ethylene-propylene-butylene ("EPB") terpolymer and 6% Ampacet Seablock 4, an anti-block masterbatch. For various sealant skins on the film shown in Table 1, Table 4 shows their coefficients of friction and Table 5 shows their bond strengths when sealed to itself for the length of time shown at the top of each column. The measurements for Tables 4 and 5 were made at 23° C. according to ASTM D1894 and ASTM F904, respectively.

TABLE 3

| Sample | Sealant Skin (wt. %) | MST for 200 g/in ° F. | MST for 200 g/in ° C. | Seal Strength (g/in) 240° F. | Seal Strength (g/in) 250° F. | Seal Strength (g/in) 260° F. |
|---|---|---|---|---|---|---|
| control | 94 EPB[1] + 6 AB MB[2] | 228 | 109 | 319 | 386 | 474 |
| 1 | 69 EPB[1] + 25 ExxonMobil Vistamaxx 3980FL + 6 AB MB[2] | 195 | 90 | 531 | 756 | 1021 |
| 2 | 69 EPB[1] + 25 ExxonMobil Vistamaxx 6102FL + 6 AB MB[2] | 187 | 86 | 602 | 770 | 837 |
| 3 | 69 EPB[1] + 25 Borealis Queo 8203 + 6 AB MB[2] | 201 | 94 | 464 | 766 | 795 |
| 4 | 69 EPB[1] + 25 Mitsui Tafmer PN-2060 + 6 AB MB[2] | 203 | 95 | 522 | 626 | 945 |
| 5 | 69 EPB[1] + 25 Mitsui Tafmer A-10855 + 6 AB MB[2] | 201 | 94 | 440 | 674 | 908 |
| 6 | 69 EPB[1] + 25 Dow Affinity PL 1840 G + 6 AB MB[2] | 225 | 107 | 490 | 480 | 735 |
| 7 | 69 EPB[1] + 25 Dow Versify 2200 + 6 AB MB[2] | 215 | 101 | 418 | 499 | 777 |
| 8 | 69 EPB[1] + 25 Dow Innate ST50 + 6 AB MB[2] | 220 | 105 | 421 | 585 | 734 |
| 9 | 69 EPB[1] + 25 Dow Infuse 9500 + 6 AB MB[2] | 211 | 100 | 418 | 471 | 716 |
| 10 | 65 EPB[1] + 15 Dow Infuse 9500 + 15 mLLDPE + 5 AB MB[2] | 211 | 99 | 458 | 479 | 750 |
| | average for non-control variables | 207 | 97 | 476 | 611 | 822 |
| | change (average variable-control) | −21 | −12 | 157 | 225 | 348 |

[1] = LydonellBasell Adsyl 7410
[2] = Ampacet Seablock 4

TABLE 4

| Sample | Sealant Skin (wt. %) | COF Static | COF Kinetic |
|---|---|---|---|
| control | 94 EPB[1] + 6 AB MB[2] | 0.30 | 0.23 |
| 1 | 69 EPB[1] + 25 ExxonMobil Vistamaxx 3980FL + 6 AB MB[2] | 0.38 | 0.31 |
| 2 | 69 EPB[1] + 25 ExxonMobil Vistamaxx 6102FL + 6 AB MB[2] | 0.39 | 0.32 |
| 3 | 69 EPB[1] + 25 Borealis Queo 8203 + 6 AB MB[2] | 0.31 | 0.26 |
| 4 | 69 EPB[1] + 25 Mitsui Tafmer PN-2060 + 6 AB MB[2] | 0.32 | 0.24 |
| 5 | 69 EPB[1] + 25 Mitsui Tafmer A-10855 + 6 AB MB[2] | 0.31 | 0.24 |
| 6 | 69 EPB[1] + Dow Affinity PL 1840 G + 6 AB MB[2] | 0.34 | 0.26 |
| 7 | 69 EPB[1] + 25 Dow Versify 2200 + 6 AB MB[2] | 0.36 | 0.26 |
| 8 | 69 EPB[1] + 25 Dow Innate ST50 + 6 AB MB[2] | 0.34 | 0.25 |
| 9 | 69 EPB[1] + 25 Dow Infuse 9500 + 6 AB MB[2] | 0.29 | 0.24 |
| 10 | 65 EPB[1] + 15 Dow Infuse 9500 + 15 mLLDPE + 5 AB MB[2] | 0.36 | 0.26 |

TABLE 5

| Sample | Sealant Skin (wt. %) | Green (g/inch) Avg. | Green (g/inch) Max. | 24 hours (g/inch) Avg. | 24 hours (g/inch) Max. | 5 days (g/inch) Avg. | 5 days (g/inch) Max. |
|---|---|---|---|---|---|---|---|
| 1 | EP + 6 AB MB[2] | 203 | 296 | 232 | 349 | 215 | 365 |
| 2 | EPB + 6 AB MB[2] | 421.5 | 641 | 221 | 611 | 405 | 622 |
| 3 | EP + 6 AB MB[2] | 599 | 798 | 343 | 468 | 227 | 643 |
| 4 | EPB + 6 AB MB[2] | 527 | 685 | 216 | 457 | 219 | 507 |
| 5 | 94 EPB[1] + 6 AB MB[2] | 531.5 | 632 | 299 | 788 | 323 | 933 |
| 6 | 69 EPB[1] + 25 ExxonMobil Vistamaxx 3980FL + 6 AB MB[2] | 493.5 | 672 | 260 | 634 | 453 | 639 |
| 7 | 69 EPB[1] + 25 ExxonMobil Vistamaxx 6102FL + 6 AB MB[2] | 567 | 736 | 222 | 890 | 401 | 1187 |
| 8 | 69 EPB[1] + 25 Mitsui Tafmer PN-2060 + 6 AB MB[2] | 535.5 | 724 | 366 | 604 | 383 | 1194 |
| 9 | 69 EPB[1] + 25 Dow Versify 2200 + 6 AB MB[2] | 592 | 740 | 325 | 518 | 337 | 508 |

[1] = LydonellBasell Adsyl 7410
[2] = Ampacet Seablock 4

Below are further example embodiments of the disclosed film that are written in claim form:

1. A multilayer film comprising:
   a core layer comprising at least 50 wt. % of high-density polyethylene;
   a first skin layer comprising an ethylene-propylene polymer; and
   a second skin layer comprising an ethylene-propylene-terpolymer, one or more α-olefin copolymers and antiblock,
   wherein the multilayer film is oriented in at least one direction.
2. The multilayer film of claim 1, further comprising one or more additives.
3. The multilayer film of claim 1, further comprising one or more tie layers.
4. The multilayer film of claim 3, wherein the one or more tie layers comprise at least one olefin block copolymer.
5. The multilayer film of claim 1, wherein the core layer further comprises low-density polyethylene.
6. The multilayer film of claim 1, wherein the core layer further comprises hydrocarbon resin, optionally in a masterbatch.
7. The multilayer film of claim 1, wherein the core layer further comprises 20 wt. % or less of linear, low-density polyethylene, hydrocarbon resin or combination thereof.
8. The multilayer film of claim 1, wherein the core layer comprises at least 80 wt % of the high-density polyethylene.
9. The multilayer film of claim 1, wherein at least one of the one or more α-olefin copolymers are metallocene-catalyzed.
10. The multilayer film of claim 1, wherein at least one of the one or more α-olefin copolymers are elastomers.
11. The multilayer film of claim 1, wherein at least one of the one or more α-olefin copolymers are propylene-ethylene polymers.
12. The multilayer film of claim 1, wherein at least one of the one or more α-olefin copolymers are ethylene-based plastomers.
13. The multilayer film of claim 1, wherein at least one of the one or more α-olefin copolymers are propylene-based elastomers.
14. The multilayer film of claim 1, wherein at least one of the one or more α-olefin copolymers are olefin-block-copolymer elastomers.
15. The multilayer film of claim 1, wherein at least one of the one or more α-olefin copolymers are plastomers.
16. The multilayer film of claim 1, wherein concentration of the one or more α-olefin copolymers is from about 15 wt. % through about 25 wt. %.
17. The multilayer film of claim 1, wherein concentration of the ethylene-propylene-butylene is in majority in the second skin layer.
18. The multilayer film of claim 1, wherein one or more of the at least one or more α-olefin copolymers comprise at least an ethylene-propylene-butylene polymer in combination with a plastomer and/or elastomer comprising propylene, ethylene, or combination thereof.

19. The multilayer film of claim 1, wherein the first skin layer is treated on a side opposing the core layer.

20. The multilayer film of claim 1, wherein the multilayer film is metallized.

While the foregoing is directed to example embodiments of the disclosed invention, other and further embodiments may be devised without departing from the basic scope thereof, wherein the scope of the disclosed compositions, systems and methods are determined by one or more claims.

What is claimed is:

1. A multilayer film comprising:
   a core layer consisting of: (i) at least 50 wt. % high-density polyethylene, (ii) linear low-density polyethylene; and (iii) hydrocarbon resin optionally in masterbatch solution, wherein (ii) and (iii) are present in a combined amount of 20 wt. % or less;
   a first skin layer consisting of an ethylene-propylene polymer, antiblock in masterbatch solution, and optionally other additives; and
   a second skin layer, which is a sealant skin, consisting of: (i) ethylene-propylene-butylene polymer, (ii) from about 15 wt. % through about 25 wt. % of one or more: α-olefin elastomers, α-olefin block copolymer elastomers, or ethylene α-olefin plastomers, and (iii) antiblock in masterbatch solution, and (iv) optionally other additives, wherein concentration of (i) is in majority in the second skin layer,
   wherein the multilayer film is oriented in at least one direction,
   wherein the multilayer film has an increase in minimum seal temperature as compared to the multilayer film having a second skin layer consisting of (i) and (iii).

2. The multilayer film of claim 1, further comprising one or more additives.

3. The multilayer film of claim 1, further comprising one or more tie layers.

4. The multilayer film of claim 1, wherein the hydrocarbon resin is in a polyethylene masterbatch.

5. The multilayer film of claim 1, wherein the one or more α-olefin elastomers, α-olefin block copolymer elastomers, or ethylene α-olefin plastomers are only propylene-ethylene polymers.

6. The multilayer film of claim 1, wherein at least one of the one or more α-olefin elastomers and/or block copolymers are propylene-based elastomers.

7. The multilayer film of claim 1, wherein the first skin layer is treated on a side opposing the core layer.

8. The multilayer film of claim 1, wherein the multilayer film is metallized.

9. The multilayer film of claim 1, wherein one outer layer of the multilayer film is coated.

10. The multilayer film of claim 1, wherein at least one outer layer of the multilayer film is laminated to a substrate.

11. The multilayer film of claim 1, wherein the first skin layer and/or the second skin layer have a thickness of about 1 μm or less.

12. A method comprising providing the multilayer film of claim 1 and forming a package therefrom.

13. The multilayer film of claim 1, wherein a static coefficient of friction is at least 0.31.

14. The multilayer film of claim 1, wherein a kinetic coefficient of friction is at least 0.24.

15. The multilayer film of claim 1, wherein seal strength is at least 418 g/in at 240° F. with a jaw pressure of 60 psi, dwell time of 0.75 seconds, and cooling time of 20 seconds.

16. The multilayer film of claim 1, wherein the one or more α-olefin elastomers, α-olefin block copolymer elastomers, or ethylene α-olefin plastomers are only propylene-ethylene elastomers.

17. The multilayer film of claim 1, wherein the one or more α-olefin elastomers, α-olefin block copolymer elastomers, or ethylene α-olefin plastomers are only propylene-ethylene block copolymer elastomers.

18. The multilayer film of claim 1, wherein the one or more α-olefin elastomers, α-olefin block copolymer elastomers, or ethylene α-olefin plastomers are only propylene-ethylene plastomers.

19. The multilayer film of claim 1, wherein composition of the (ii) of the second skin layer consists of at least two members selected from a group consisting of: the α-olefin elastomers, the α-olefin block copolymer elastomers, and the ethylene α-olefin plastomers.

* * * * *